Nov. 27, 1951 W. M. GOODALL 2,576,833

FREQUENCY MODULATION DETECTOR

Filed May 19, 1948 2 SHEETS—SHEET 1

INVENTOR
W. M. GOODALL
BY H. A. Burgess
ATTORNEY

Nov. 27, 1951 W. M. GOODALL 2,576,833

FREQUENCY MODULATION DETECTOR

Filed May 19, 1948 2 SHEETS—SHEET 2

INVENTOR
W.M.GOODALL
BY H. A. Burgess
ATTORNEY

Patented Nov. 27, 1951

2,576,833

UNITED STATES PATENT OFFICE 2,576,833

FREQUENCY MODULATION DETECTOR

William M. Goodall, Oakhurst, N. J., assignor to Bell Telephone Laboratories, Incorporated, New York, N. Y., a corporation of New York Application May 19, 1948, Serial No. 27,906

8 Claims. (Cl. 250—27)

The present invention relates to the detection of frequency-modulated waves.

A feature of the invention is a balanced discriminator for use, particularly, as a conversion circuit in a receiver of frequency-modulated waves.

An object of the invention is the detection of waves modulated as to frequency by a modulating wave or signal having a relatively broad band, with low distortion and linear response over the entire band.

This is achieved in accordance with this invention by use of a balanced discriminator circuit comprising inverse reactances which, in specific embodiment, are associated with a pair of resistors in the configuration of a constant resistance network, that is, one having the same resistance at all frequencies in the band. This network provides two branches, one of which gives an increasing response with frequency and the other a decreasing response with frequency. The radio frequency waves traversing the two circuit branches are in phase quadrature relation to each other. Detectors are bridged across the reactances and are differentially connected to the signal output circuit.

In one form the inverse reactances are provided by sections of uniform transmission line connected at their inner ends to the respective circuit branch; terminated at their far ends by, in one case, an open circuit and, in the other case, a short circuit, and each adjusted in length relative to the wavelength at mid-band to exhibit at their inner ends the desired reactance. This, as stated, is capacitive in one case and inductive in the other.

The nature of the invention and its objects and features will be more fully understood from the following detailed description in connection with the accompanying drawing in which.

Figures 1, 2:
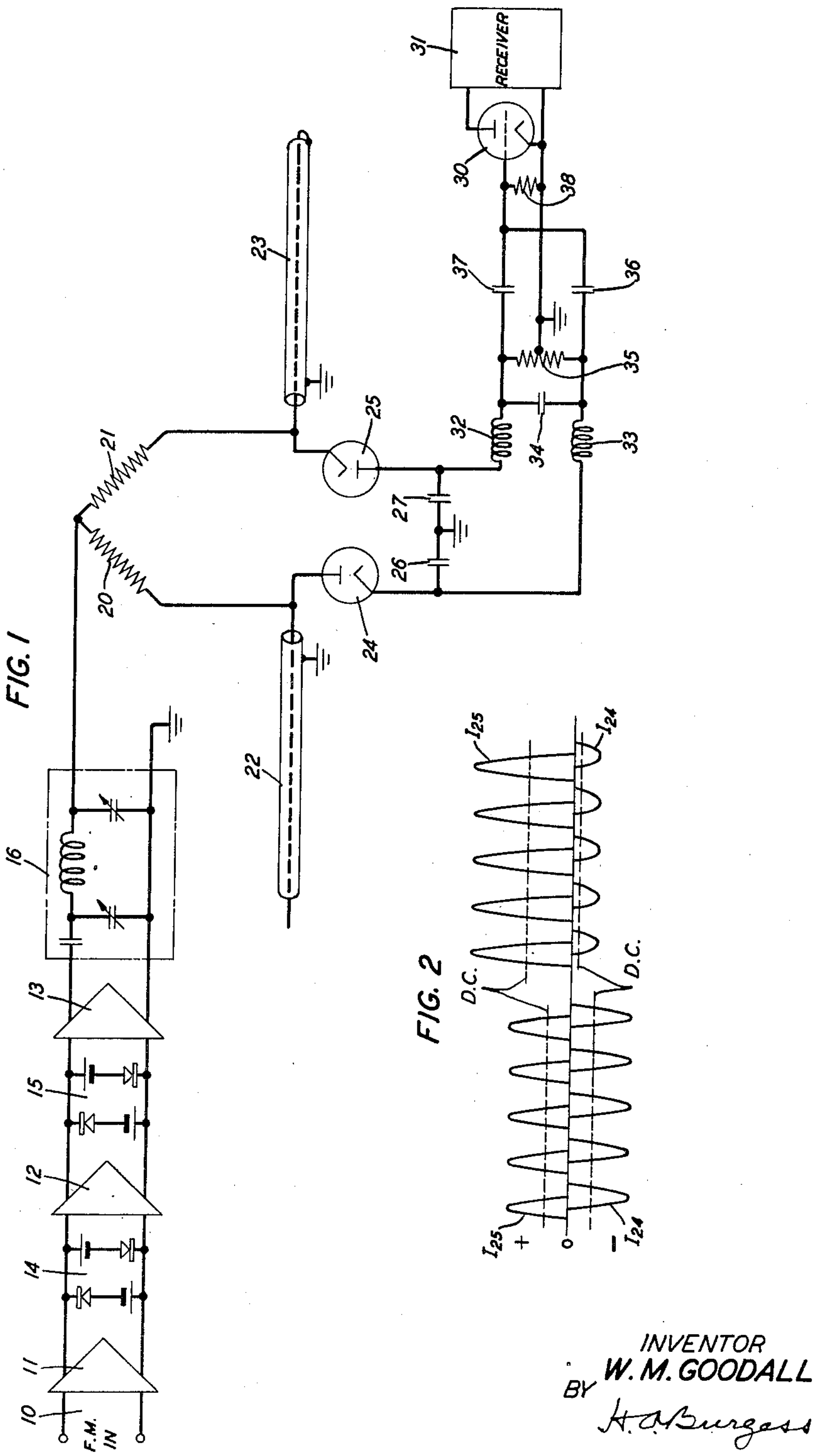
Fig. 1 is a schematic circuit diagram of a receiving system embodying the present invention.
Fig. 2 shows graphs of wave forms to be referred to in the description of the operation of the balanced discriminator.

In Fig. 1 the frequency-modulated waves are received over a line or on an antenna from which they are impressed on the input 10 leading to an amplifying and limiting circuit of usual type comprising successive amplifier stages, 11, 12 and 13 to the number desired in any particular case. Amplitude limiters are included between stages, as at 14 and 15, comprising in each case shunting varistors such as silicon or other type crystals, by way of example. These are designed in known manner to eliminate substantially entirely the amplitude fluctuations in the high frequency waves, leaving only a wave varying in instantaneous frequency to be impressed on the detecting portion of the system.

The frequency-modulation detector is shown as comprising the resistors 20, 21 of equal magnitude R, the reactors 22 and 23 in the form of sections of coaxial cable, and the rectifying detectors 24 and 25. These are shown as diode vacuum tubes, but crystal rectifiers such as silicon or germanium may also be used. Line section 22 is open-circuited at its far end while line section 23 is short-circuited at its far end. These line sections are of the same length and this length is equal to an odd number of eighths of a wavelength, the latter referring to the wavelength in the line at mid-band frequency. A good length for practical construction is ⅝ of a wavelength. Total reflection occurs in each line at the far end, as a result of which one line advances the phase of waves at its inner end by 45 degrees and the other line retards the phase by 45 degrees. The former acts like a capacitive reactance and the latter like an inductive reactance. These are designed to have respective magnitudes C and L, where the ratio $L/C=R^2$, and the circuit formed of the two parallel branches 20, 22 and 21, 23 have the configuration of a constant resistance network. As stated, the high frequency voltages in the two branches are in quadrature phase relation.

Diode rectifiers 24 and 25 are reversely connected across respective reactances 22, 23 so that their rectified outputs are subtracted in their common output connection to the grid of low frequency amplifier 30, leading to the signal receiver 31. The connections to the diodes are balanced to ground at radio frequencies by use of radio frequency capacities 26 and 27. Further means for separating radio frequency from signal frequency currents comprises the radio frequency chokes 32, 33. The balanced-to-unbalanced connections for the signal frequency currents comprise large shunting capacity 34, resistor 35 in bridge of the circuit, with center tap to ground, and small signal frequency condensers 36, 37 connected to the grid of tube 30.

In one embodiment the various elements had values as follows:

| | |
|---|---|
| Mean radio frequency (mid-band) megacycles | 65 |
| Modulated band ——do | 65±2 |
| Characteristic impedance of each line section 22, 23 ——ohms | 76 |
| Resistors 20, 21, each ——do | 76 |
| Resistance 35, each half ——do | 2,000 |
| Leak 38 ——megohm | ⅓ |
| Inductances 32, 33, each ——micro-henries | 50 |
| Condensers: | |
| 26, 27, each ——micromicrofarads | 10 |
| 34 ——microfarads | 1,000 |
| 36, 37, each ——do | ¼ |
| Length of line sections ——wavelength | ⅝ |

When there is no signal modulation but only a constant frequency wave of mid-band frequency is being received, equal rectified high frequency currents are produced which are in phase quadrature as shown in the left-hand half of Fig. 2. Since the rectifiers are oppositely poled, the direct current components of the rectified high frequency waves are opposite in sign. The high frequency components are filtered out by the shunt capacities 26, 27 and the series inductances 32, 33, and the direct currents flow through respective halves of resistor 35 to ground. If the circuit is perfectly balanced, no high frequency or direct current components reach the grid of tube 30.

When the frequency increases during, say, a positive swing of the modulating wave, one side of the balanced discriminator responds more strongly and the opposite side less strongly on account of the inverse reactances 22 and 23, and an amplitude-modulated high frequency wave is impressed on each detector 24, 25. This condition is represented in the right-hand half of Fig. 2. The direct current or low frequency component represents the signal. The signal current $I_{25}$ is greater in amplitude than $I_{24}$ and the difference current in resistor 35 makes the upper terminal more positive than the lower. Thus, a positive signal voltage is impressed on the amplifier 30. When the high frequency swings in the opposite direction due to a negative lobe of the modulating current, $I_{24}$ is greater than $I_{25}$ and a negative voltage is impressed on the amplifier 30.

The circuit is symmetrical due to its configuration and to the use of uniform lines as the inverse reactances. This causes the non-linearity to be symmetrical above and below the mean frequency and so admits of straightforward compensation by an equalizer which has an attenuation curve varying with frequency-departure from mid-band in inverse ratio to the distortion to be corrected. Such an equalizer is shown at 16 for coupling the discriminator circuit to the constant-amplitude input circuit. This network has high attenuation to harmonics generated in the limiters.

Since the discriminator of the invention has a constant resistance input impedance over the band, it substantially eliminates interaction between the slope circuit elements 22, 23 and the constant amplitude input circuit.

The length of the reactance lines 22 and 23 could theoretically be any odd multiple of ⅛ wavelength, such as ⅛, ⅜, ⅝, etc., but the value ⅝ wavelength is a good compromise value. Longer lines give higher magnitudes of reactance but the variation of reactance with frequency departures from mean value are less linear than for shorter lines. The choice of line length in any particular case may be influenced by the degree of circuit balance desired, and by how closely the detectors are matched in characteristics and whether they are linear or square law detectors.

The system disclosed in Fig. 1 is well suited to the reception of waves of a variety of wide-band types such as multichannel carrier telephony or television. While the carrier waves have been referred to as high frequency or radio frequency waves in the foregoing description, they were in one system as actually used, the intermediate frequency wave of a micro-wave transmission system.

The reversed connection of the detectors with individual output circuit branches, reduces the effect of residual amplitude modulation which might be due to noise, fading, etc., and also tends to cancel even order distortion products. It also facilitates connection to a single sided output amplifier. The separation of the direct current components in the two paths allows each diode to be self biased to its optimum operating point.

The circuit balance of the discriminator-detector can be modified by use of small trimming condensers across a section of reactive line or across a diode, if desired.

Figure 3:
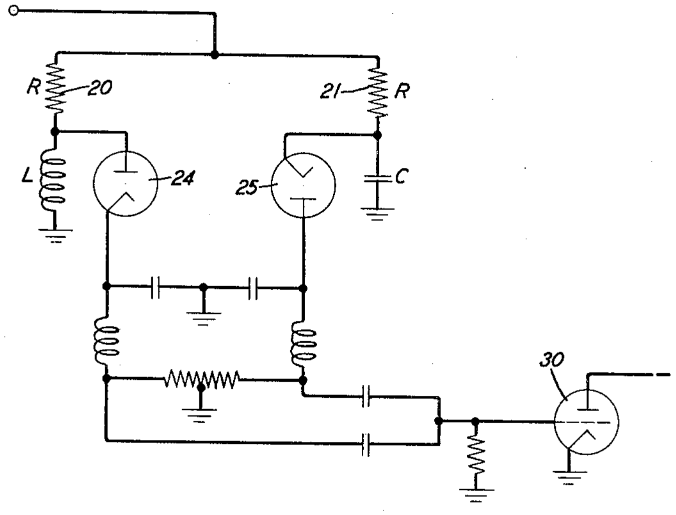
Figs. 3 and 4 show modified forms of balanced discriminator according to the invention.
Figure 4:
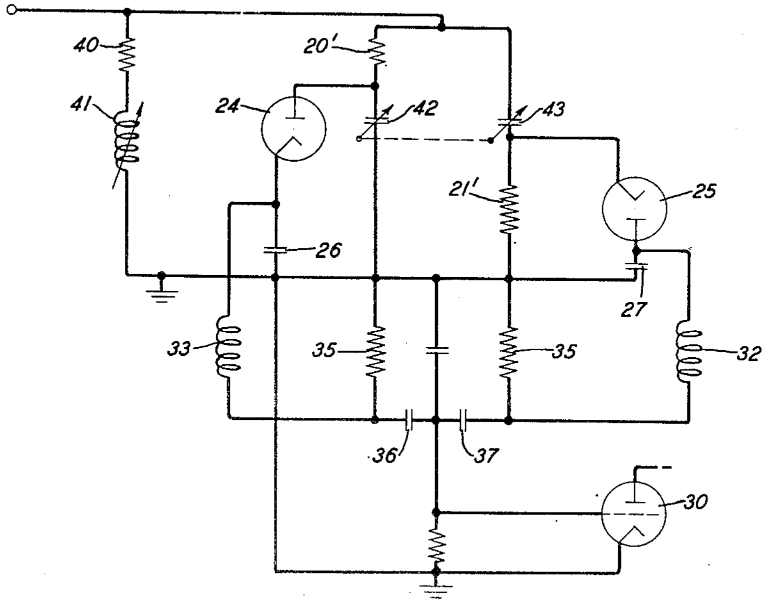

Two other circuit sketches are included as Figures 3 and 4 for illustration, these replacing the portion of Fig. 1 to the right of the filter 16.

Fig. 3 differs from Fig. 1 in having lumped reactances L and C in place of the coaxial line sections. Instead of a simple inductance and a simple capacity as shown, other forms of lumped reactance can be used, such for example as a series resonant circuit and a parallel resonant circuit, each tuned to a frequency near the edge of the used band, in order to provide reactances which vary more steeply with frequency.

The circuit of Fig. 1 is tunable by merely varying the length of the reactance line sections, which can be done by mechanically movable sleeve-sections. Fig. 4 illustrates a circuit which is readily tunable using lumped reactances, this circuit departing from ideal conditions for convenience of manipulation. The quarter-phase circuits comprise in this case series resistance and capacity in each branch of the discriminator, with the diode connected across the resistance (21′) in one branch and across the capacity (42) in the other branch. Condensers 42 and 43 are ganged for simultaneous variation. The input impedance is adjusted at mid-band by the added resistance 40 and inductance 41, the latter variable. Resistance 40 has the value R, while resistors 20′ and 21′ each have the value 2R. The other elements of the circuit can be identified by the reference numerals, which correspond with those on Fig. 1. Except for the difference noted, the operation of Figs. 3 and 4 is similar to that of Fig. 1.

The invention is not to be construed as limited to the specific circuits that have been shown and described, nor to numerical values or quantities given, since these are for illustration; and the scope of the invention is defined in the claims.

What is claimed is:

1. In a frequency modulation receiver, a constant resistance network comprising four arms composed of a first resistance, a second resistance, both of value R, an inductance of value L and a capacitance of value C, in that order in bridge configuration, in which $L/C=R^2$, an input for received frequency-modulated waves connected across the diagonal ending at the junction of the resistance arms, a rectifier across each reactance arm, and an output circuit for detected currents differentially coupled to said two rectifiers.

2. In a receiver for frequency modulated waves, a frequency modulation detector comprising parallel paths each including in series relation a resistor and a section of uniform transmission line of length equal to ⅝ of the wavelength at the mean frequency of the received waves, said lines having short-circuit and open-circuit terminations respectively at their outer ends and having characteristic impedances related to the resistances of said resistors to make the combined impedance of the two paths a constant resistance, circuit means for impressing the received waves between the outer terminals of said paths, rectifying detectors connected across the input ends of said lines, and a common output circuit for the resulting rectified currents connected in differential relation to said rectifiers.

3. In a frequency modulated wave receiver, an input circuit, a balanced discriminator circuit connected thereto comprising two parallel paths each including a resistance and a reactance in series, the reactance in one of said two paths being the inverse of that in the other path, and the resistances and reactances being proportioned to provide a constant resistance input impedance, a rectifier connected across each reactance, and a receiver for demodulated waves connected in differential relation to said rectifiers.

4. A balanced discriminator for receiving and detecting frequency modulated waves comprising an input terminal, two circuit paths branched from said terminal, one path comprising resistance of value R and capacitive reactance of value C in series, the other path comprising resistance of value R and inductive reactance of value L in series, in which $L/C=R^2$, two rectifiers, one being connected across the reactance in each path, and a signal receiver for detected waves differentially connected to said two rectifiers.

5. A circuit according to claim 4, comprising separate direct current paths for the rectified currents, said separate paths being symmetrical and each including a resistance to ground, high frequency by-pass circuits to ground in shunt relation to said last mentioned resistances, and signal frequency condensers connecting the ungrounded ends of said last mentioned resistances to said signal receiver.

6. A circuit according to claim 3, in which each of said reactances is in the form of a section of uniform transmission line ⅝ wavelength long at the mid-band frequency, one of said line sections being terminated at the end remote from its connection to the respective rectifier in an open circuit and the other line section being terminated at such remote end in a short circuit.

7. In a receiver for frequency modulated waves, a frequency modulation detector comprising parallel paths each including in series relation a resistor and a section of uniform transmission line of length equal to $N\lambda/8$, where N is an odd integer and $\lambda$ is the wavelength at mid-band of waves traversing the line section, said lines having short-circuit and open-circuit terminations respectively at their outer ends and having characteristic impedances related to the resistances of said resistors to make the combined impedance of the two paths a constant resistance, circuit means for impressing the received waves between the outer terminals of said paths, rectifying detectors connected respectively across the input ends of said lines, and a common output circuit for the resulting rectified currents connected in differential relation to said rectifying detectors.

8. In a receiver for frequency modulated waves, a frequency modulation detector comprising parallel paths each including in series relation a resistor and a section of uniform coaxial cable five-eighths wavelength long at the mid-band frequency the inner conductor of said cable at its input end being connected to said resistor and its outer conductor being grounded, said cables having short-circuit and open-circuit terminations respectively at their outer ends and having characteristic impedances related to the resistances of said resistors to make the combined impedance of the two paths a constant resistance, circuit means for impressing the received waves between the outer terminals of said paths, rectifying detectors connected respectively across the input ends of said cables, and a common output circuit for the resulting rectified currents connected in differential relation to said rectifying detectors.

WILLIAM M. GOODALL.

REFERENCES CITED

The following references are of record in the file of this patent:

UNITED STATES PATENTS

| Number | Name | Date |
|---|---|---|
| 2,151,127 | Logan et al. | Mar. 21, 1939 |
| 2,302,834 | Bliss | Nov. 24, 1942 |
| 2,312,070 | Bliss | Feb. 23, 1943 |
| 2,383,855 | Hansell | Aug. 28, 1945 |

OTHER REFERENCES

"Ultra-High Frequency Radio Engineering," by W. L. Emery, 1944, Chapter VII, Pages 132–157.